US009139977B2

(12) United States Patent
McCain et al.

(10) Patent No.: US 9,139,977 B2
(45) Date of Patent: Sep. 22, 2015

(54) SYSTEM AND METHOD FOR ORIENTING AN IMPLEMENT ON A VEHICLE

(75) Inventors: Steven Daniel McCain, Tracy, CA (US); Vernon Joseph Brabec, Livermore, CA (US); Alexander Omelchenko, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 1172 days.

(21) Appl. No.: 12/685,855

(22) Filed: Jan. 12, 2010

(65) Prior Publication Data

US 2011/0169949 A1 Jul. 14, 2011

(51) Int. Cl.
*H04N 7/18* (2006.01)
*E02F 3/84* (2006.01)
*G01B 11/02* (2006.01)

(52) U.S. Cl.
CPC .............. *E02F 3/847* (2013.01); *G01B 11/022* (2013.01)

(58) Field of Classification Search
CPC ....... E02F 3/847; E02F 9/264; B60R 2300/60
USPC .................................................. 348/148, 137
See application file for complete search history.

(56) References Cited

U.S. PATENT DOCUMENTS

| 3,894,230 | A | | 7/1975 | Rorden et al. |
| 6,108,076 | A | * | 8/2000 | Hanseder ................... 356/141.1 |
| 6,736,216 | B2 | * | 5/2004 | Savard et al. ...................... 172/1 |
| 6,880,643 | B1 | * | 4/2005 | Zimmerman et al. ......... 172/4.5 |
| 2005/0197756 | A1 | * | 9/2005 | Taylor et al. ..................... 701/50 |
| 2008/0118154 | A1 | * | 5/2008 | Kurth et al. .................... 382/190 |
| 2008/0180537 | A1 | * | 7/2008 | Weinberg et al. ......... 348/211.99 |
| 2008/0309949 | A1 | * | 12/2008 | Rueb .............................. 356/614 |
| 2009/0083672 | A1 | * | 3/2009 | Fitzmaurice et al. ......... 715/851 |
| 2010/0295945 | A1 | * | 11/2010 | Plemons et al. .............. 348/148 |
| 2011/0045906 | A1 | * | 2/2011 | Berman et al. .................. 463/32 |

FOREIGN PATENT DOCUMENTS

| EP | 0262764 A1 | 4/1988 |
| EP | 0797075 A2 | 9/1997 |
| EP | 2132971 A1 | 12/2009 |

(Continued)

OTHER PUBLICATIONS

International Search Report dated Apr. 27, 2011 from PCT/US2010/003041, filed Nov. 24, 2010.

(Continued)

*Primary Examiner* — Joe Chacko
(74) *Attorney, Agent, or Firm* — Chiesa Shahinian & Giantomasi PC (57) ABSTRACT

A system for determining an orientation of an implement on a vehicle is provided. The system includes a camera mounted to the vehicle, and a target object within a field of vision of the camera and mounted to the implement. The target object includes markings to enable a determination of the orientation of the implement with respect to the camera. A method of determining an orientation of an implement on a vehicle is provided. A system of orienting an implement is provided. A method of installing an implement orientation system is provided. A computer-readable medium having stored thereon computer-executable instructions is provided. The computer-executable instructions cause a processor to perform a method of determining an orientation of an implement when executed.

31 Claims, 4 Drawing Sheets

(56) References Cited

FOREIGN PATENT DOCUMENTS

| | | |
|---|---|---|
| EP | 2187166 A2 | 5/2010 |
| JP | 6156974 | 6/1994 |
| JP | 9193078 | 7/1997 |
| JP | 11217853 | 8/1999 |
| JP | 2005055177 A | 3/2005 |
| JP | 2008510992 A | 4/2008 |
| WO | 0186078 A1 | 11/2001 |
| WO | 02059428 A1 | 8/2002 |
| WO | 2006025885 A1 | 3/2006 |

OTHER PUBLICATIONS

Written Opinion dated Apr. 27, 2011 from PCT/US2010/003041, filed Nov. 24, 2010.

Kevin M. Lynch, Determining the Orientation of a Painted Sphere from a Single Image: A Graph Coloring Problem, Nov. 2001, pp. 1-11, Department of Mechanical Engineering, Northwestern University, Evanston, Illinois.

Notice of Reasons for Rejection mailed on Oct. 14, 2014, in connection with Japanese Patent Application No. 2012-547985, 4 pgs.

* cited by examiner

SYSTEM AND METHOD FOR ORIENTING AN IMPLEMENT ON A VEHICLE

FIELD OF THE INVENTION

The present invention relates to earth-moving vehicles and agricultural implements. In particular, the present invention relates to orienting an implement on a vehicle.

BACKGROUND OF THE INVENTION

Earth-moving machines are used in various operations for road building, grading, building, mining, etc. Agricultural implements are used for various operations related to farming including plowing, seeding, spraying, harvesting, etc. In both situations, a vehicle having three or more wheels, or two or more treads, may have an implement attached. The implement may be a blade, scoop, hoe, plow, grader, or any other possible implement. The implement may be attached to the vehicle by one or more articulating arms, and may be rotatable in three dimensions. The position and angle of the implement may therefore be adjusted by an operator in the vehicle using hydraulic controls, or by any other appropriate control mechanism.

The location and angle of an implement have conventionally been determined based on a determination by an operator based on visual assessment. A demand for increased precision in many operations has arisen recently in order to reduce costs and/or improve quality of a finished product. Sensors have therefore been utilized to determine position and angle of an implement of a vehicle. However, due to the extreme circumstances under which these sensors must operate, a high failure rate and/or a low accuracy have been until now realized.

Global positioning systems (GPS) have been used to position people and vehicles. Additionally, GPS systems have been located on implements to provide location information for the implement. However, positioning the sensitive electronics related to a GPS on an implement may result in system failures and degraded position information.

A more accurate system and method for positioning an implement on a vehicle are therefore required.

SUMMARY OF THE INVENTION

A system for determining an orientation of an implement on a vehicle is provided. The system includes a camera mounted to the vehicle, and a target object within a field of vision of the camera and mounted to the implement. The target object includes markings to enable a determination of the orientation of the implement with respect to the camera. The target object may be a sphere, a grade rod, or any other appropriate object A method of determining an orientation of an implement on a vehicle is provided. The method includes detecting at least one target object with at least one camera. The target object is mounted to the implement and includes markings. The method also includes determining the orientation of the implement using at least some of the markings.

A system of orienting an implement is provided that includes means for detecting at least one target object attached to the implement, and means for determining an intermediate orientation of the at least one target object with respect to the at least one camera using markings on the target object. The method also includes means for determining the orientation of the implement using the intermediate orientation of the target object.

A method of installing an implement orientation system is provided that includes mounting a camera on a vehicle having an implement, and mounting a target object to the implement within a field of vision of the camera, the target object including markings. The method also includes coupling the camera to a processor adapted to determine an orientation of the implement by determining an intermediate orientation of the target object with respect to the camera using at least some of the markings.

A computer-readable medium having stored thereon computer-executable instructions is provided. The computer-executable instructions cause a processor to perform a method of determining an orientation of an implement when executed.

These and other advantages of the invention will be apparent to those of ordinary skill in the art by reference to the following detailed description and the accompanying drawings.

DETAILED DESCRIPTION

The present invention addresses the aforementioned limitations in conventional earth-moving vehicles and agricultural implements by arranging a target object on the implement and arranging a camera directed at the target. A processor evaluating an image of the target determines a distance to, and orientation of, the target, and uses that information to determine a position and orientation of the implement.

The system may use cameras mounted on the cab or any other position on the vehicle. One or more cameras may be used, and one or more targets may be arranged on the implement. When using multiple cameras and multiple targets, each camera may have only one target in a field of vision, or each camera may have more than one target, or even all targets, arranged in a field of vision. The system and method may process only one imaged target, or each of the imaged targets when multiple targets are viewed by a camera. A camera may position a target by viewing a set of markings on the target. For instance, a target may be a sphere having a set of markings enabling the processor to determine the orientation of the sphere from the image.

Figure 4:
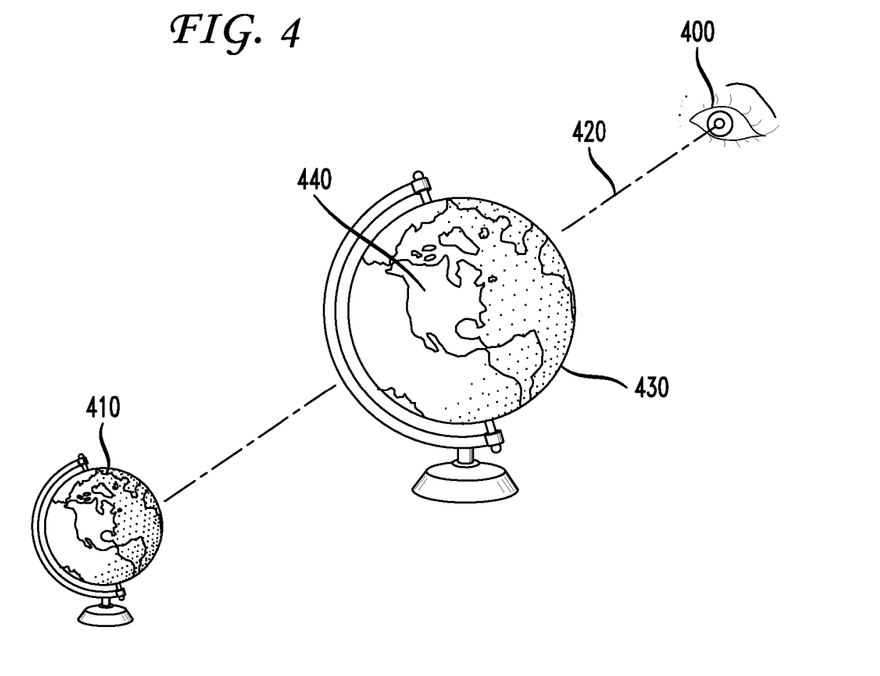
FIG. 4 illustrates schematically an exemplary orientation method.

FIG. 4 illustrates schematically a method for orienting a sphere. Eye 400 views globe 410 along line of sight 420. Eye 400 may process image 430 of globe 410. Image 430 may include markings 440 representing land masses and oceans. By comparing image 430 to an internal representation of the earth gleaned from viewing globes or maps, a person may determine the orientation of globe 410. In the same manner, a processor in a vehicle may determine an orientation of the sphere or other target object mounted on an implement by comparing an image of the markings visible to a camera with an internal record of the markings of the target object. Further positioning information may be available to the processor by means of a GPS system or other location system. The processor may use stored information relating to a distance between the GPS receiver or antenna and the camera, as well as information related to the mounting of the target object on the implement, in performing calculations of position and orientation. For instance, a distance and direction of the mounting of the target object with respect to the implement may be stored in a storage device accessible by the processor.

Alternative exemplary embodiments of the instant invention provide that the target object (also referred to alternatively as the target) may be a sphere, an elliptical object, a rod or grade rod, or any other appropriate shape. The target object may be solid or hollow and may be composed of any appropriate material, including plastic or metal. The target object may have markings that may include distinctive shapes, different colors, or specific shape arrangements which may provide orientation information to the processor.

The desired position and orientation of the implement may include rotation about X, Y, and Z axes, as well as a distance and direction from the vehicle. Each of these rotations, distance, and direction of an implement may be manipulable by an operator of the vehicle using hydraulic control or other control mechanisms. Additionally, the processor determining position and orientation may be coupled to a display in the cab for viewing by an operator, or may have direct control of the implement. The processor or a dedicated control system may be adapted to direct the vehicle and implement either directly or indirectly in a stored work plan and/or toward a stored goal.

In the system, the target object includes markings to enable a determination of an orientation of the target object with respect to the camera, which is also referred to herein as an intermediate orientation. This intermediate orientation may be used by the processor to determine the orientation of the implement with respect to the camera using stored information relating to the mounting of the target object on the implement, including a distance and direction from the target object to the implement. When a second target object is used, a determination of a second intermediate orientation of the second target object with respect to the camera may be made.

A positioning system antenna may be mounted to the vehicle at a fixed distance in a fixed direction from the camera, and a positioning system receiver/processor may be coupled to the positioning system antenna. A control system may be adapted to adjust the orientation of the implement based on a desired orientation of the implement and the determination of the orientation of the implement.

A second camera with a second fixed distance and a second fixed orientation with respect to the positioning system may be used. The second camera may have a second field of vision including the target object, and the markings of the target object may enable a determination of a third intermediate orientation of the target object with respect to the second camera.

A processor may be electrically coupled to the positioning system receiver/processor and the camera and perform the determination of the intermediate orientation of the target object with respect to the camera based on the markings. The processor may be adapted to determine the second and third intermediate orientations, as appropriate. The processor may further be adapted to perform the determination of the orientation of the implement based on one or all of the intermediate orientation and the second and third intermediate orientations.

The positioning system receiver/processor is adapted to determine a vehicle position and a vehicle orientation in a world reference frame. For example, the reference frame used may be WGS 84 (the World Geodetic System of 1984). The determination of the intermediate orientation of the target object with respect to the camera may be in a vehicle reference frame. In other words, an origin of the reference frame may be fixed with respect to the vehicle, and the orientation of the target object may be with respect to the vehicle as well as the camera, since the camera may be fixed to the vehicle. In this case, the determination of the orientation of the implement may also be in the vehicle reference frame. The determination of the orientation of the implement in a vehicle reference and the vehicle orientation in the world reference frame may enable a determination of a further orientation of the implement in the world reference frame.

A data storage unit may be coupled to the processor. The processor may be adapted to determine a distance from the camera to the target object by comparing an image of the target object to information relating to a shape and a dimension of the target object stored in the data storage unit. A distance from the camera to an object may be determined by a size of the target in the image. A processor may determine distance to the target using image size information along with stored size information and lens information. Alternatively, the processor may use stored image files and compare them with the image to determine the distance. The camera may be mounted to the implement at a third fixed distance in a third fixed direction from the target object. The processor may be adapted to determine a position of the implement based on the distance determined by the processor between the camera and the target object, the third fixed distance, the third fixed direction, the vehicle position, and the vehicle orientation.

The implement may be an earth-moving implement and the vehicle may be an earth-moving machine. The positioning system receiver/processor and the camera may be mounted to a cab of the earth-moving machine.

The markings may include different shapes arranged on a surface of the target object, and identification of at least some of the different shapes may enable the determination of the orientation, as discussed in connection with FIG. 4. The different shapes may have different sizes, and identification of at least some of the different sizes may enable the determination of the orientation. The markings may include different colors arranged on a surface of the target object, and identification of at least some of the different colors may enable the determination of the orientation. The different colors may include at least some photoreflective elements, and identification of at least some of the photoreflective elements may enable the determination of the orientation.

Figure 1:
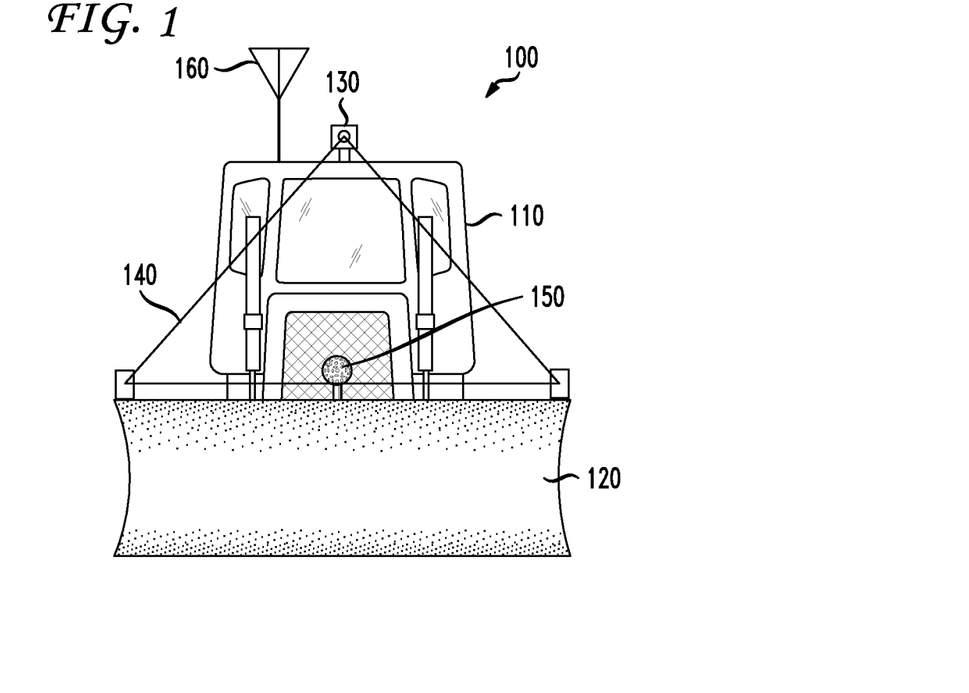
FIG. 1 illustrates a first exemplary embodiment of the present invention.

FIG. 1 illustrates a first exemplary embodiment of the present invention. Vehicle 100 includes cab 110 and implement 120. Implement 120 shown in FIG. 1 is a blade, and therefore vehicle 100 may be a bulldozer with a bulldozer blade. Implement 120 may be controlled by an operator in cab 110 by hydraulic controls and/or any other appropriate control mechanism. Cab 110 may have a camera 130 mounted on top of it. Alternatively, camera 130 may be mounted on the sides of cab 110 or may be mounted in any other appropriate location on vehicle 100. Camera 130 may be able to adjust its field of vision 140 by turning and/or zooming. Target object 150 may be mounted on the center top portion of implement 120. Alternatively, target object 150 may be mounted on the top edge at the sides of implement 120, or at any other appropriate location, so long as target object 150 is in field of vision 140 of camera 130.

Camera 130 may output an image of target object 150 to a processor. The processor may determine an orientation of target object 150 and/or a distance to target object 150. The processor may determine therefrom an orientation and position of implement 120 with respect to the remainder of vehicle 100. The processor may further determine a global position and orientation of implement 120 based on global positioning information obtained from antenna 160 and a global positioning system.

Figure 2:
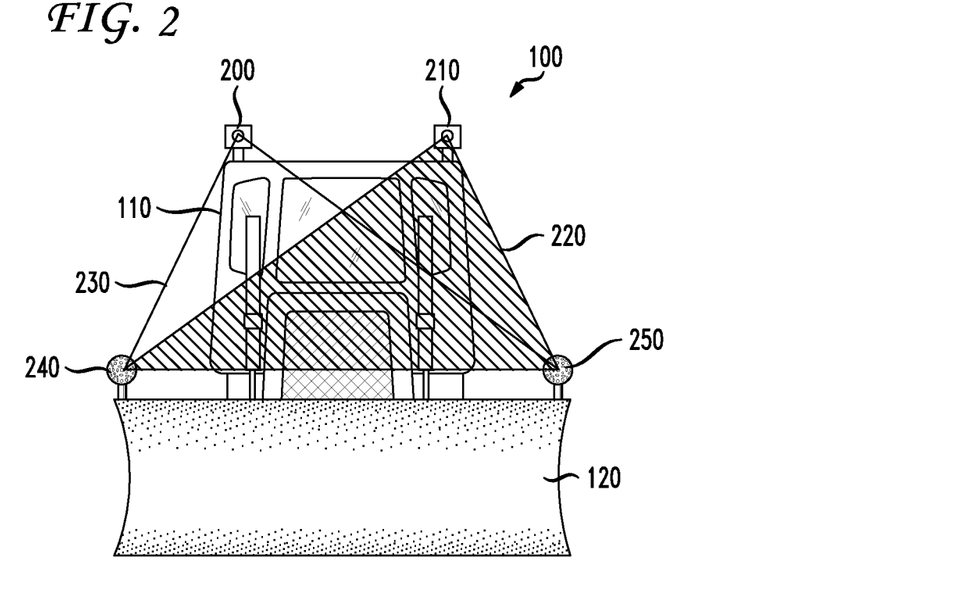
FIG. 2 illustrates another exemplary embodiment of the present invention.

FIG. 2 illustrates another exemplary embodiment according to the instant invention. In FIG. 2, vehicle 100 includes implement 120 and cab 110. Target objects 240 and 250 are mounted on opposite ends of a top edge of implement 120. Cameras 200 and 210 are mounted on top of cab 110 on opposite edges. Camera 200 has field of vision 230 which includes both target objects 240 and 250. Camera 210 has field of vision 220 which also includes both target objects 240 and 250. Alternative exemplary embodiments of the instant invention may provide that each camera may have only one target object within a field of vision. Still further exemplary embodiments may include more cameras and/or more targets, and each camera may have one or more targets within a field of vision. Additionally, in the case of multiple target objects within a field of vision of a camera, a processor may determine orientation image from one or more of the target objects included in the processed image. This determination by the processor whether to determine orientation information may be based on a quality of the image of a particular target object.

Figure 3:
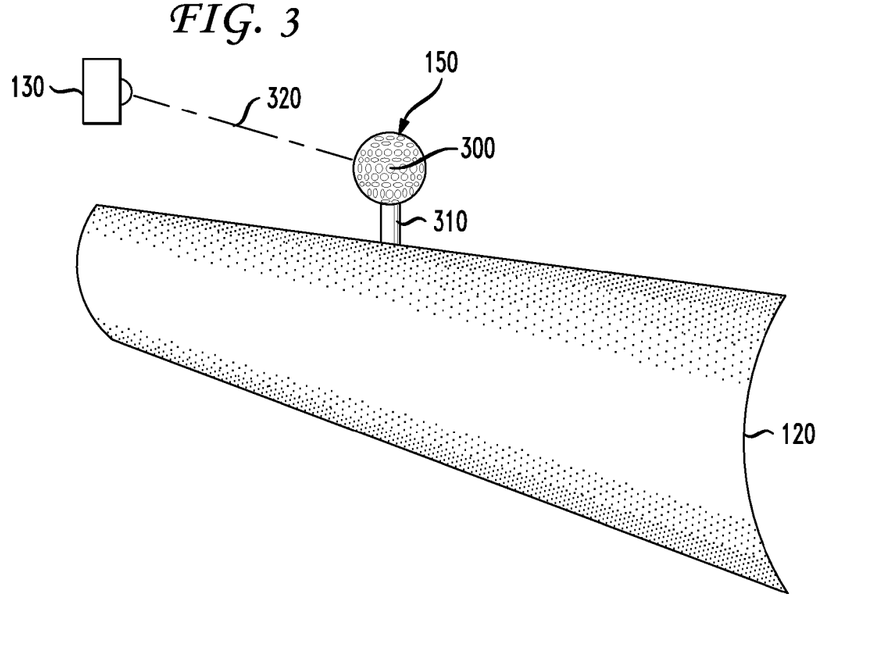
FIG. 3 illustrates schematically a camera for orienting an implement using a sphere.

FIG. 3 illustrates schematically a system according to the present invention. Camera 130 is directed at target object 150 which is mounted on a blade or implement 120. Target object 150 in FIG. 3 is a sphere including markings 300. Markings 300 of target object 150 present a unique image along line of sight 320 to camera 130. A processor connected to camera 130 may therefore determine an orientation of target object 150 with respect to camera 130. The processor may determine an orientation of implement 120 based on stored information relating to mounting arrangement 310 for target object 150. Markings 300 may include unique shapes, sizes and/or colors, including photoreflective elements, all of which may provide orientation information to a processor. Additionally, the image produced by camera 130 of target object 150 may include size information for target object 150, which may provide a processor with information for determining a distance to target object 150. The distance to target object 150 from camera 130 may provide position information for implement 120.

Figure 5:
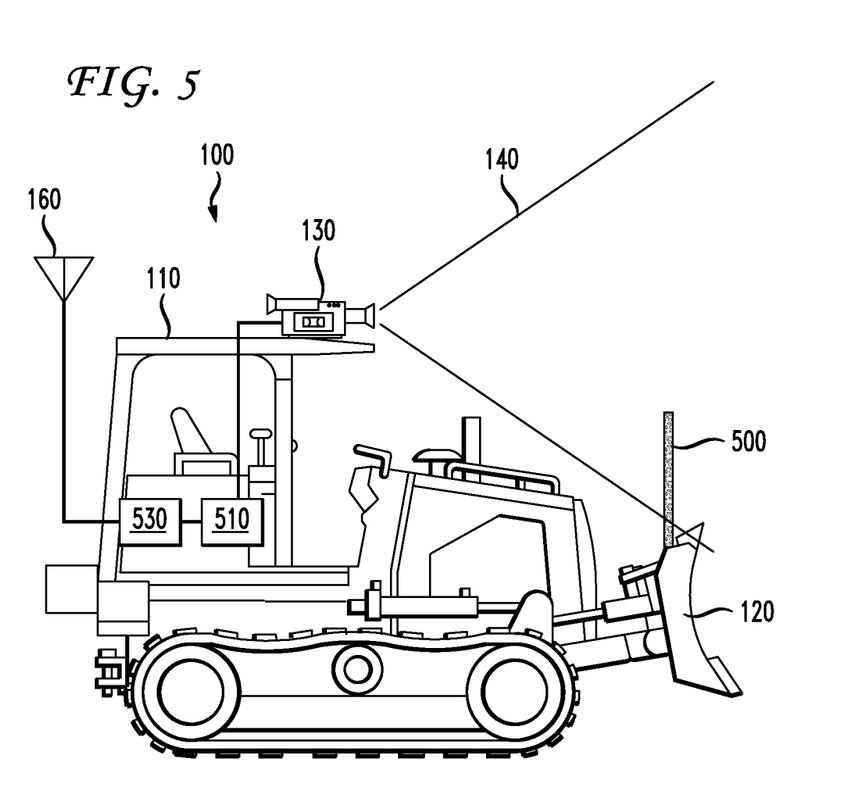
FIG. 5 illustrates another exemplary embodiment of the present invention.

FIG. 5 illustrates another exemplary embodiment of the present invention including a grade rod as a target object. Vehicle 100 includes cab 110 and implement 120. Camera 130 is mounted on cab 110. Camera 130 may have a field of vision 140 which encompasses grade rod 500. Grade rod 500 may be mounted on implement 120, and may include markings 520 including distinctive shapes, distinctive relative positions of shapes, and distinctive colorings including photoreflective elements. Additionally, more than one grade rod 500 may be positioned on implement 120. In particular, a grade rod 500 may be positioned on each end of implement 120 to provide additional position and orientation information. Camera 130 may be electrically coupled to computer 510, which may be arranged inside cab 110. Additional positioning information may be obtained from GPS antenna 160, which may also include GPS system 530 for processing positioning information. Alternatively, the processor/receiver of a GPS system may be integrated into computer 510. Computer 510 may combine positioning information obtained from GPS antenna 160 and from the images obtained from camera 130 to determine an exact position and orientation for implement 120. Orientation information may be determined by computer 510 based on an angle of an image of grade rod 500, a relative size of a top and bottom of an image of grade rod 500, a length of an image of grade rod 500, and stored information about the size, shape, mounting, and markings of grade rod 500. Also, when two or more grade rods are employed, the processor may compare the images of the two or more grade rods, along with the above-mentioned information, to determine position and orientation information.

Active light emitting diodes (LEDs, also referred to herein as active light elements) may be mounted on the one or more grade rods, or any other target discussed herein, including a sphere. The LEDs may emit infrared light, and may be point sources or may form any of the target shapes discussed herein. The LEDs may be viewed by one or more cameras mounted on a vehicle cab, for instance a dozer body. The cameras may be sensitive in the light spectrum, the infrared spectrum, both spectrums, or any other appropriate electromagnetic spectrum. Active LED targets using the infrared spectrum may provide several advantages over the visible spectrum, including improved viewing in dusty environments and inclement weather conditions.

One grade rod mounted on an implement, for example in the middle of an implement, with one or more LEDs or other markings arranged on it, may be sufficient for orientation. For example, if the grade rod is installed on a dozer on which only elevation and slope of the blade are automatically controlled, one rod with markings or LEDs will provide measurements of both blade elevation and blade slope, which is enough for blade control.

Additionally, LEDs may not have significant power consumption requirements, and therefore the LED system on the implement may be equipped with long-lasting batteries to eliminate power cables leading from the cab of the implement. An additional power source, such as photovoltaic solar cells on top of the rod, may be provided. In some modes using batteries and photovoltaic solar cells, when sunlight is significant, the LEDs may consume power from the solar cells and the batteries may simultaneously be charged from the solar cells. When sunlight is insufficient to operate the LEDs, the LEDs receive power from the batteries. In this manner, the batteries and solar cells complement each other as power sources, and there may be no need to replace the batteries.

Figure 6:
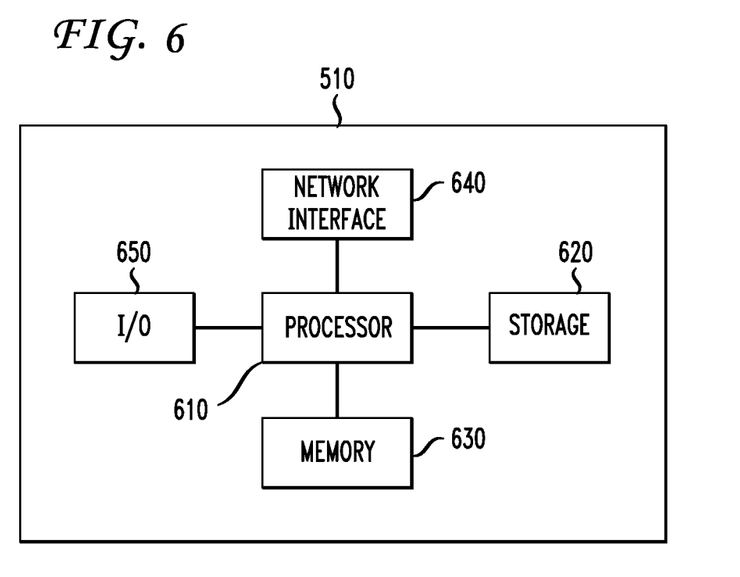
FIG. 6 is a block diagram of a computer in accordance with an embodiment of the present invention.

FIG. 6 is a high level block diagram of a computer in accordance with an embodiment of the present invention. Computer 510 can perform any processing described above, and/or can perform the steps described above or illustrated in FIG. 7. Computer 510 contains processor 610 which controls the operation of the computer by executing computer program instructions which define such operation, and which may be stored on a computer-readable recording medium. The computer program instructions may be stored in storage 620 (e.g., a magnetic disk, a database) and loaded into memory 630 when execution of the computer program instructions is desired. Thus, the computer operation will be defined by computer program instructions stored in memory 630 and/or storage 620 and computer 510 will be controlled by processor 610 executing the computer program instructions. Computer 510 also includes one or more network interfaces 640 for communicating with other devices, for example other computers, servers, or websites. Network interface 640 may, for example, be a local network, a wireless network, an intranet, or the Internet. Computer 510 also includes input/output 650, which represents devices which allow for user interaction with the computer 510 (e.g., display, keyboard, mouse, speakers, buttons, webcams, etc.). One skilled in the art will recognize that an implementation of an actual computer will contain other components as well, and that FIG. 6 is a high level representation of some of the components of such a computer for illustrative purposes.

Figure 7:
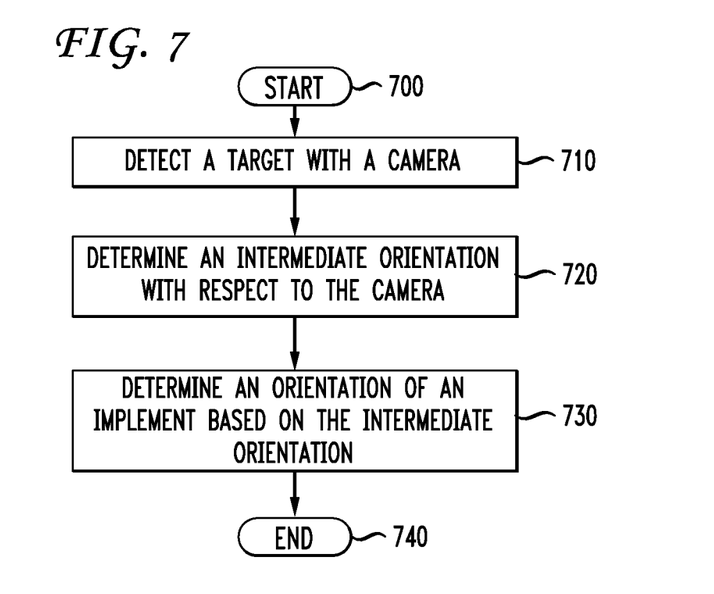
FIG. 7 illustrates an exemplary method according to the present invention.

FIG. 7 illustrates an exemplary method accord to the present invention. The method of FIG. 7 starts at start circle 700 and proceeds to operation 710, which indicates to detect a target with a camera. From operation 710, the flow proceeds to operation 720, which indicates to determine an intermediate orientation with respect to the camera. From operation 720, the flow proceeds to operation 730, which indicates to determine an orientation of an implement based on the intermediate orientation. From operation 730, the flow proceeds to end circle 740.

A method of installing an implement orientation system may include mounting a camera on a vehicle having an implement and mounting a target object to the implement within a field of vision of the camera. The target object may include markings. The method may also include coupling the camera to a processor adapted to determine an orientation of the implement by determining an intermediate orientation of the target object with respect to the camera using at least some of the markings.

The method may include mounting a positioning system on the vehicle. The method may include mounting a second target object within a field of vision of the camera and attached to the implement. The second target object may include second markings. The processor may be adapted to determine a second intermediate orientation of the second target object using the second markings.

The method may include mounting a second camera on the vehicle and arranging the second camera to include the target object in a second field of vision. The method may include coupling the second camera to the processor. The processor may be adapted to determine the orientation of the implement by determining another intermediate orientation of the target object with respect to the second camera using at least some of the markings.

The installation method may also include downloading mounting information to a storage device coupled to the processor to enable the determination of orientation and position. The installation alternatively or additionally may include calibrating the camera and/or processor by obtaining images of the target object after mounting with the implement in known positions and orientations.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A system for determining an orientation of an implement on a vehicle, comprising:
a camera mounted to the vehicle;
a sphere within a field of vision of the camera and mounted to the implement, the sphere including a plurality of markings thereon to enable a determination of an intermediate orientation of the sphere with respect to the camera, wherein each of the plurality of markings has a unique shape, and wherein the determination of the orientation of the implement is made using the intermediate orientation of the sphere;
a positioning system antenna mounted to the vehicle at a fixed distance in a fixed direction from the camera;
a positioning system receiver/processor coupled to the positioning system antenna; and
a control system adapted to adjust the orientation of the implement based on a desired orientation of the implement and the determination of the orientation of the implement; and
wherein:
the positioning system receiver/processor is adapted to determine a vehicle position and a vehicle orientation in a world reference frame;
the determination of the intermediate orientation of the sphere with respect to the camera is in a vehicle reference frame;
the determination of the orientation of the implement is in the vehicle reference frame; and
the determination of the orientation of the implement in the vehicle reference frame and the vehicle orientation in the world reference frame enables a determination of a further orientation of the implement in the world reference frame.

2. The system of claim 1, further comprising a second sphere within the field of vision of the camera mounted to the implement, the second sphere including a second plurality of markings to enable a determination of a second intermediate orientation of the second sphere with respect to the camera, wherein each of the second plurality of markings has a unique shape.

3. The system of claim 1, further comprising a second camera with a second fixed distance and a second fixed orientation with respect to the positioning system, the second camera having a second field of vision including the sphere, the plurality of markings of the sphere enabling a determination of a third intermediate orientation of the sphere with respect to the second camera.

4. The system of claim 1, further comprising a processor electrically coupled to the positioning system receiver/processor and the camera, the processor adapted to perform the determination of the intermediate orientation of the sphere with respect to the camera based on at least some of the plurality of markings, and the processor further adapted to perform the determination of the orientation of the implement.

5. The system of claim 4, further comprising a data storage unit coupled to the processor; wherein the camera is mounted to the implement at a third fixed distance in a third fixed direction from the sphere; and wherein the processor is further adapted to determine a position of the implement based on the distance, the third fixed distance, the third fixed direction, the vehicle position, and the vehicle orientation.

6. The system of claim 1, wherein:
the implement is an earth-moving implement;
the vehicle is an earth-moving machine; and
the positioning system receiver/processor and the camera are mounted to a cab of the earth-moving machine.

7. The system of claim 1, wherein:
the plurality of markings is arranged on a surface of the sphere, and identification of an arrangement of the at least some of the plurality of markings enables the determination of the orientation.

8. The system of claim 7, wherein: the plurality of markings have unique sizes; and identification of the at least some of the plurality of markings having unique sizes enables the determination of the orientation.

9. The system of claim 1, wherein:
the plurality of markings include different colors arranged on a surface of the sphere; and
identification of the at least some of the different colors enables the determination of the orientation.

10. The system of claim 9, wherein:
the different colors include at least some photoreflective elements; and
identification of at least some of the photoreflective elements enables the determination of the orientation.

11. The system of claim 1, wherein:
the at least some of the plurality of markings include active light elements arranged on a surface of the sphere; and
identification of at least some of the active light elements enables the determination of the orientation.

12. A method of determining an orientation of an implement on a vehicle, comprising:
detecting at least one sphere with at least one camera, the at least one sphere being mounted to the implement and including a plurality of markings thereon;
determining, in a vehicle reference frame, an intermediate orientation between the at least one sphere and the at least one camera, wherein the intermediate orientation is determined using at least some of the plurality of markings, wherein each of the plurality of markings has a unique shape;
determining the orientation of the implement using the intermediate orientation between the at least one sphere and the at least one camera, the determining the orientation of the implement being in the vehicle reference frame and based on the intermediate orientation;
determining a vehicle position and a vehicle orientation in a world reference frame; and
determining a further orientation of the implement with respect to the world reference frame based on the orientation of the implement in the vehicle reference frame and the vehicle orientation in the world reference frame.

13. The method of claim 12, further comprising:
determining a position of the at least one camera attached to the vehicle; and
adjusting the orientation of the implement based on a desired orientation of the implement and the determined orientation.

14. The method of claim 12, wherein:
the implement is an earth-moving implement;
the vehicle is an earth-moving machine; and
the camera is mounted to a cab of the earth-moving machine.

15. The method of claim 12, further comprising determining a distance from the at least one camera to the at least one sphere by comparing an image of at least some of the plurality of markings on the at least one sphere to stored information relating to a shape and a dimension of the at least some of the plurality of markings of the at least one sphere.

16. The method of claim 12, wherein the at least one sphere includes at least a first sphere and a second sphere.

17. The method of claim 12, wherein the at least one camera includes at least a first camera and a second camera.

18. The method of claim 12, wherein:
the plurality of markings includes different shapes arranged on a surface of the at least one sphere; and
the determining of the orientation includes identifying at least some of the different shapes.

19. The method of claim 18, wherein:
the different shapes have different sizes; and
the determining of the orientation operation includes identifying at least some of the different sizes.

20. The method of claim 12, wherein:
the plurality of markings includes different colors arranged on a surface of the at least one sphere; and
the determining of the orientation includes identifying at least some of the different colors.

21. The method of claim 20, wherein:
the different colors include at least some photoreflective elements; and
the determining of the orientation includes identifying at least some of the photoreflective elements.

22. The method of claim 12, wherein:
the plurality of markings includes active light elements arranged on a surface of the sphere; and
the determining of the orientation includes identifying at least some of the active light elements.

23. A system of orienting an implement, comprising:
means for detecting at least one sphere attached to the implement, the at least one sphere including a plurality of markings thereon;
means for determining an intermediate orientation of the at least one sphere with respect to the means for detecting the at least one sphere using at least some of the plurality of markings, wherein each of the plurality of markings has a unique shape; and
means for determining the orientation of the implement using the intermediate orientation of the at least one sphere; and
wherein:
the intermediate orientation of the at least one sphere is in a vehicle reference frame; and
the orientation of the implement is in the vehicle reference frame; and further comprising:
means for determining a vehicle position and a vehicle orientation in a world reference frame; and
means for determining a further orientation of the implement with respect to the world reference frame based on the orientation of the implement in the vehicle reference frame and the vehicle orientation in the world reference frame.

24. The system of claim 23, further comprising means for adjusting the orientation of the implement based on a desired orientation.

25. The system of claim 23, further comprising means for determining a position of the vehicle.

26. The system of claim 23, further comprising means for determining a distance from the means for detecting the at least one sphere by comparing an image of the at least some of the plurality of markings on the at least one sphere to stored information relating to a shape and a dimension of the at least some of the plurality of markings on the at least one sphere.

27. A method of installing an implement orientation system, comprising:
mounting a camera on a vehicle having an implement;
mounting a sphere to the implement within a field of vision of the camera, the sphere including a plurality of markings thereon;
coupling the camera to a processor adapted to determine an orientation of the implement by determining an intermediate orientation of the sphere with respect to the camera using at least some of the plurality of markings, wherein each of the plurality of markings has a unique shape;
mounting a positioning system antenna mounted to the vehicle at a fixed distance in a fixed direction from the camera;
mounting a positioning system receiver/processor coupled to the positioning system antenna;

providing a control system adapted to adjust the orientation of the implement based on a desired orientation of the implement and the determination of the orientation of the implement; and wherein:

the positioning system receiver/processor is adapted to determine a vehicle position and a vehicle orientation in a world reference frame;

the determination of the intermediate orientation of the sphere with respect to the camera is in a vehicle reference frame;

the determination of the orientation of the implement is in the vehicle reference frame; and the determination of the orientation of the implement in the vehicle reference frame and the vehicle orientation in the world reference frame enables a determination of a further orientation of the implement in the world reference frame.

28. The method of claim 27, further comprising mounting a positioning system on the vehicle.

29. The method of claim 27, further comprising:

mounting a second sphere within a field of vision of the camera and attached to the implement, the second sphere including a second plurality of markings;

wherein the processor is adapted to determine a second intermediate orientation of the second sphere using at least some of the second plurality of markings, wherein each of the plurality of markings has a unique shape.

30. The method of claim 27, further comprising:

mounting a second camera on the vehicle;

arranging the second camera to include the sphere in a second field of vision; and coupling the second camera to the processor; wherein the processor is further adapted to determine the orientation of the implement by determining another intermediate orientation of the sphere with respect to the second camera using at least some of the plurality of markings.

31. A non-transitory computer-readable medium storing computer program instructions for determining an orientation of an implement, which, when executed on a processor, cause the processor to perform operations comprising:

determining a position of a camera;

determining an intermediate orientation of a sphere mounted to the implement and within a field of vision of the camera, the sphere including a plurality of markings, the determination of the intermediate orientation of the sphere being performed using at least some of the plurality of markings, wherein each of the plurality of markings has a unique shape, the determining of the intermediate orientation of the sphere is in a vehicle reference frame;

determining the orientation of the implement using the position of the camera and the intermediate orientation of the sphere, the determining the orientation of the implement being in the vehicle reference frame and based on the intermediate orientation;

determining a vehicle position and a vehicle orientation in a world reference frame; and determining a further orientation of the implement with respect to the world reference frame based on the orientation of the implement in the vehicle reference frame and the vehicle orientation in the world reference frame.

\* \* \* \* \*